Oct. 27, 1964  W. T. BOOTH  3,154,341
TONNEAU COVER
Filed April 27, 1962  3 Sheets-Sheet 1
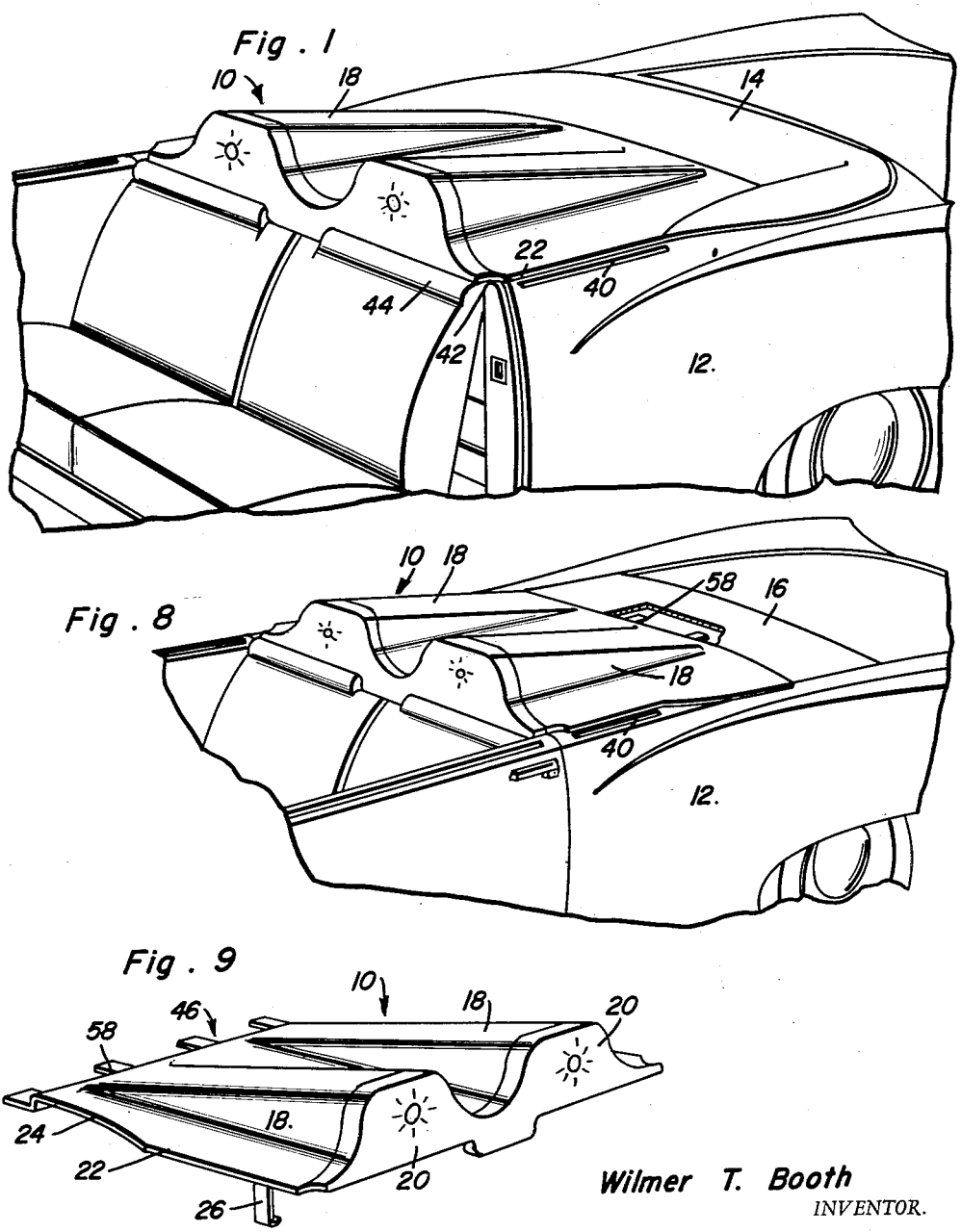
Wilmer T. Booth
INVENTOR.

Oct. 27, 1964 W. T. BOOTH 3,154,341
TONNEAU COVER
Filed April 27, 1962 3 Sheets-Sheet 2
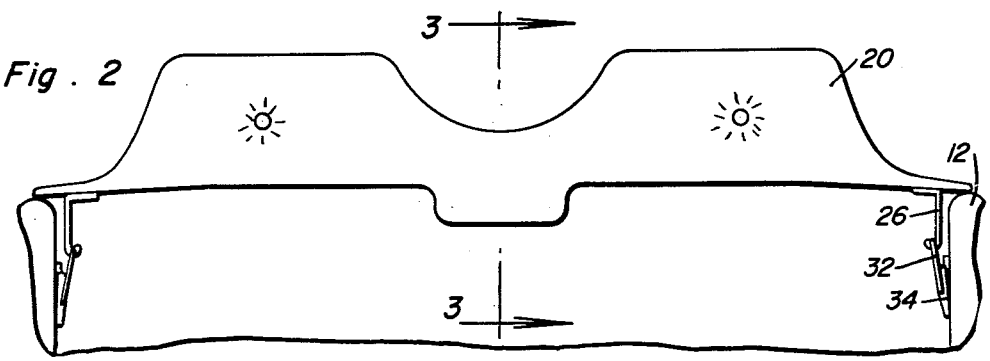
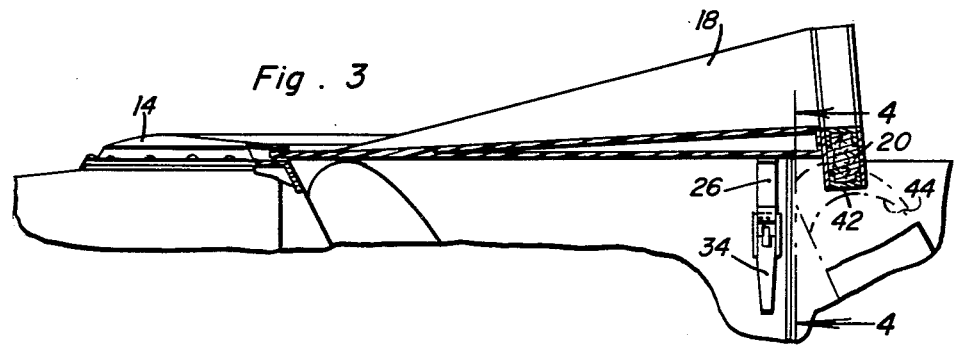
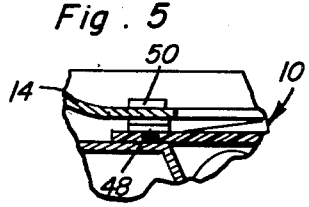 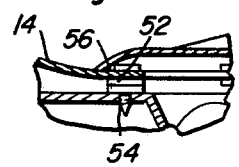 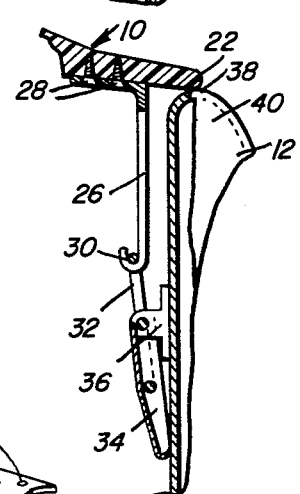
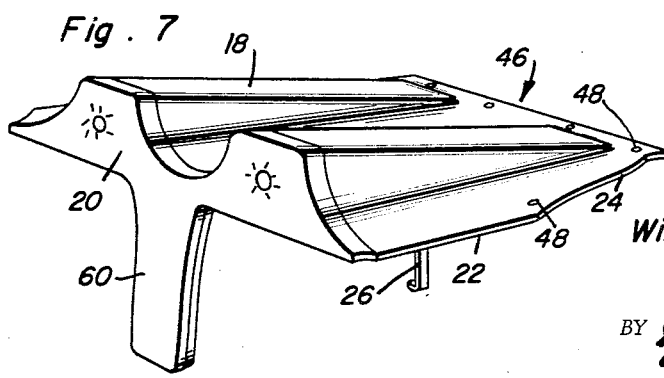
Wilmer T. Booth
INVENTOR.

Oct. 27, 1964 W. T. BOOTH 3,154,341
TONNEAU COVER
Filed April 27, 1962 3 Sheets-Sheet 3
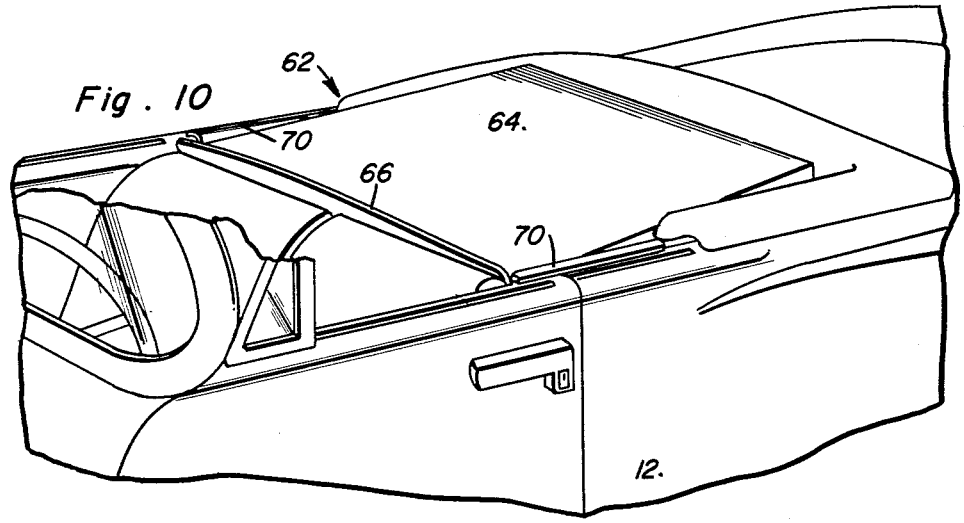
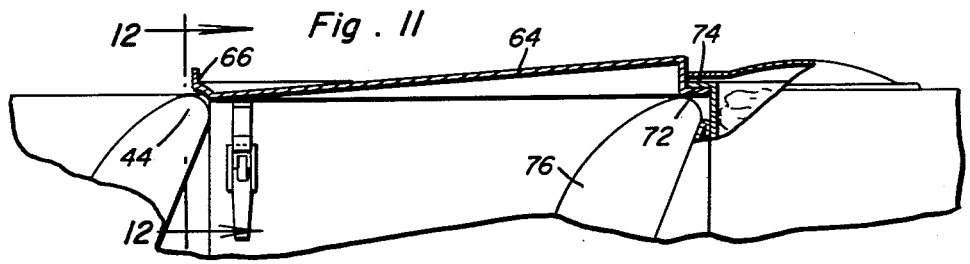
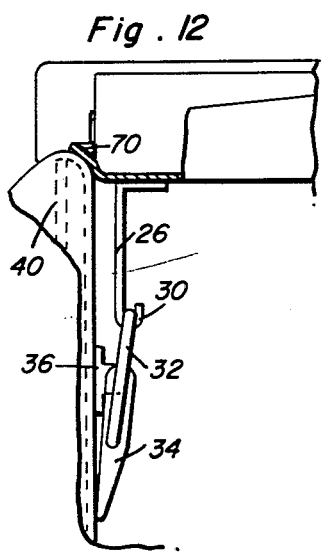
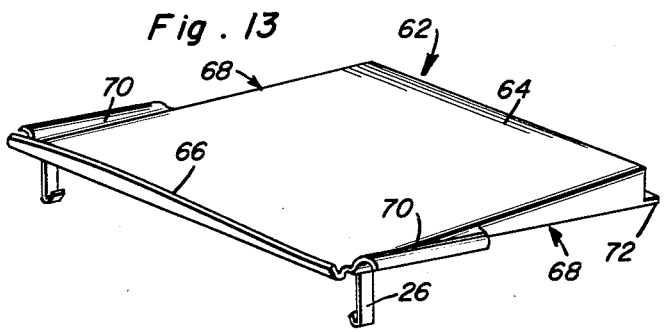
Wilmer T. Booth
INVENTOR.

United States Patent Office 3,154,341
Patented Oct. 27, 1964

3,154,341
TONNEAU COVER
Wilmer T. Booth, 117 W. Lotus Road,
Wildwood Crest, N.J.
Filed Apr. 27, 1962, Ser. No. 190,644
8 Claims. (Cl. 296—24)

The present invention generally relates to convertible automobiles, and more particularly relates to tonneau covers adapted to enclose the rear seat of such convertible automobiles.

Generally, the majority of the convertibles now being manufactured include both a front and rear seat which are simultaneously exposed upon the retraction or removable of the convertible top. While the ability to remove the convertible top is, to many people, a highly desirable feature, it is noted that the use of an open car has many undesirable drawbacks. For example, in such an open car it is frequently impossible to carry objects in the back seat both because of the action of the various wind currents which, aside from tending to introduce dust and various foreign bodies, would also tend to dislodge the objects being carried, and because of the greater probability of theft of the various objects positioned in such an open rear seat. Additionally, in view of the manner in which the above mentioned wind currents circulate through the car due to the open rear seat, thus tending to chill the occupants, the season for the use of such a convertible with the top withdrawn is relatively short. In this connection it will also be noted that the open area in the rear seat quickly dissipates any heat generated by the heating system of the car.

In view of the foregoing, one of the primary objects of the present invention is the provision of the means for enclosing the rear seat of a convertible while allowing the top to remain in its retracted or open position.

Another significant object of the present invention is the provision of a means for greatly increasing the amount of available storage space in a standard convertible. This is of particular importance in the types of convertibles wherein the entire top folds into the trunk of the automobile thereby leaving little or no storage space.

A further object of the present invention is the provision of a tonneau cover which will tend to streamline the lines of a convertible so as to give the appearance of a sports type car as well as to reduce the wind resistance and flow of currents through the automobile so as to provide greater comfort on cool days.

Also, an object of the present invention is to provide a tonneau cover including a headrest for both the driver and passengers of an automobile thereby greatly increasing both the comfort and the safety of these riders.

Likewise, an object of the present invention is the provision of a tonneau cover capable of providing all of the above objects while at the same time not interfering with the normal operation of the windows, top or seats, all of which may be opened, closed or adjusted in the normal manner.

The last object to be specifically enumerated is the provision of a tonneau cover which can be quickly and easily installed or removed with a minimum amount of effort while at the same time being of such a construction so as to enable it to be manufactured relatively inexpensively so as to insure its availablity to anyone desiring such a cover.

These together with other objects and advangtages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a partial perspective view illustrating the tonneau cover of the present device secured to a convertible provided with a standard boot;

FIGURE 2 is a partial elevational view looking rearwardly from a position just forward of the door jamb of FIGURE 1 with the back of the front seat removed;

FIGURE 3 is a cross-sectional view taken substantially on a plane passing along line 3—3 in FIGURE 2;

FIGURE 4 is a partial cross-sectional view taken substantially on a plane passing along line 4—4 in FIGURE 3 and illustrating the manner in which a tonneau cover is secured with the edge thereof in contact with the side of the automobile body;

FIGURE 5 illustrates one manner securing the tonneau cover to a soft boot;

FIGURE 6 illustrates a modification of FIGURE 5 wherein the tonneau cover is loosely engaged upon the top side of a soft boot;

FIGURE 7 illustrates one form of the tonneau cover provided with a depending central portion so as to enclose the space normally provided between the two front bucket seats on some types of convertibles;

FIGURE 8 illustrates a perspective view of a convertible having a hard boot with the tonneau cover being provided with extending tabs for engagement beneath the hard boot;

FIGURE 9 is a perspective view of the tonneau used with a hard boot such as illustrated in FIGURE 8;

FIGURE 10 is a perspective view of a modified form of tonneau cover positioned on a convertible;

FIGURE 11 is a cross-sectional view illustrating the manner in which the modified tonneau is secured in place;

FIGURE 12 is a partial cross-sectional view taken substantially on a plane passing along line 12—12 in FIGURE 11; and FIGURE 13 is a persepective view of the modified tonneau cover.

Referring now more particularly to the drawings, the reference numeral 10 generally designates the tonneau cover comprising the present invention. This cover 10, as best seen in FIGURES 1 and 8, is adapted to be positioned over and completely enclose the rear seat of a conventional convertible automobile 12 provided with either a soft boot 14 or hard boot 16. It is preferred that the tonneau cover 10 be made of synthetic material such as Fiberglas, however, as is readily apparent, any other suitable material can be used such as for example, metal, wood, wood products, cloth or coated wire mesh.

In its preferred form, the cover 10 is provided with two portions 18 extending upwardly from the top thereof and tapering from front to rear so as to present a streamlined appearance to the viewer thereof. Each of these raised portions 18 are positioned approximately so as to enable both the driver and the front seat passenger to rest their heads thereagainst. And, in regard to this matter it will be noted that a padded front 20 is secured to the forward end of the cover 10 so as to provide both an attractive appearance as well as a reasonably comfortable headrest. This padding 20 can be of any conventional cushioning material and is generally covered with a material which will complement the upholstery of the car. In this connecttion it will also be noted that the remainder of the tonneau cover 10 is preferably of a color either matching or complementing the color of the convertible. Attention is directed to the fact that the cover 10 having the padding 20 therein, in addition to providing a comfortable headrest for the user thereof, also provides a means for effectively preventing any sudden backlash of the head of a rider, such as might occur in a rear end collision.

As best seen in FIGURES 7 and 9, the edges 22 of the cover 10 are shaped or recessed as at 24, so as to conform to the shape of the supporting structure on which it rests. The shaping of these edges 22 can of course be varied in accordance with the requirements of the different makes of convertible automobiles.

The cover 10 is additionally provided with a pair of depending brackets, each located adjacent one edge 22 near the forward end thereof. These brackets, referred to by reference numeral 26, are secured to the cover 10 in any conventional manner, such as by screws 28. Each of the brackets 26 is provided with an inwardly curved end 30 which is adapted to receive a metal loop 32 pivotally connected at its opposite end to a lever 34 which is in turn pivotally engaged at one end to a bracket means 36 fixedly secured to the car body 12 in any conventional manner. Accordingly, the cover 10 is secured in position by engaging the edges 22 with the upper edge 38 of the car body 12, positioning the loop 32 within the inwardly bent portion 30, and finally, downwardly pivoting the lever 34 so as to fixedly clamp the cover 10 in position. As seen in FIGURES 1, 4, 8 and 12, the edges 22 are positioned inwardly of the windows 40 so as to permit free use of the windows 40 while the tonneau cover 10 is being used. When the cover 10 is secured in such a manner, the lower edge of the forward end of the cover 10, as well as the lower edge of the cushioning 20, is normally positioned slightly above the upper edges of the front seats. The reference numeral 42 generally refers to the lower edge of the front end of the cover 10 as well as the lower edge of the cushioning 20, and reference numeral 44 refers to the top edge of the front seats. This spacing is specifically provided so as to allow for the adjustment of the front seats when the cover 10 is in position.

The rear edge 46 of the tonneau cover 10 is generally secured in contact with the convertible top boot 14 or 16 in a manner so as to form a complete closure therebetween. As is readily apparent, various modifications of this rear end must be provided so as to accommodate the various different types of conventional boots. FIGURES 5 and 7 disclose the provision of snaps 48 located both in the rear end 46 and in the side edge 22 for the purpose of snapping into engagement with the snaps 50 provided on the inner edges of some types of soft boots 14.

FIGURE 6 shows a further modification wherein the soft boot 14 is directly secured to the car body by means of cooperating snaps 52 and 54. In this modification it will be noted that the rear end 56 of the cover 10 is curved downwardly so as to tightly engage the soft boot 14 upon securing the cover 10 to the car body 12 by a downward pivoting of the lever 34. While only two ways of securing the soft boots have been illustrated, the present invention is obviously not limited thereby inasmuch as the tonneau cover 10, especially with the downwardly curved end 56, can obviously be used with a wide range of modified bodies.

FIGURES 8 and 9 show a further modification of the rear end 46 wherein a plurality of offset projecting tabs 58 are provided. This modification particularly adapts the cover 10 for use with convertibles including hard boots 16. These projecting tabs 58 are first inserted between the hard boot 16 and the car body 12 and then the cover is tightly clamped in position in the aforementioned manner. These tabs 58 are only of a length sufficient so as to be engaged beneath the hard boot 16, and do not interfere with the opening of the boot and the subsequent raising of the top. In this connection it will also be noted that the tonneau cover 10 does not, in any of its modifications, interfere with the opening or closing of the convertible top which enables the user thereof to leave the tonneau cover 10 in position and at the same time completely enclosing the automobile.

Attention is again directed to FIGURE 7 wherein a modified form of the cushion 20 is illustrated. This modified form is provided with a depending central portion 60 which is adapted to fit between and cover the space normally provided between bucket seats of the type used in various ones of the newer convertible automobiles.

FIGURES 10–13 show a further modification of the tonneau cover of the present invention. This modification is generally referred to by reference numeral 62 and is generally secured to a convertible automobile in the same manner as set forth supra, and as such, similar features are referred to by the same reference numerals applied to the features in FIGURES 1–9. The tonneau cover 62 is provided with a forwardly inclined upper surface 64 terminating at the forward end in an upwardly and outwardly extending flange 66 adapted to be positioned slightly above the top edge 44 of the front seat so as to allow for the free adjustment thereof. The side edges 68 of the cover 62 are each provided with an extending portion 70 shaped so as to conform with the upper edge of the automobile body 12 in the manner best illustrated in FIGURE 12. A flange 72 is provided on the rear end of the cover 62 and is adapted to be engaged with a portion 74 of the body 12 located above and to the rear of the upper edge of the rear seat 76. While the flange 72 has been specifically illustrated, it is readily apparent that various modified forms of the rear end of the cover 62 can be substituted therefor, such as those illustrated in FIGURES 5, 6 and 9.

In view of the foregoing, it is considered to be readily apparent that a novel tonneau cover has been invented which enables the user thereof to safely and conveniently store various objects in the rear seat of his convertible while at the same time avoiding the necessity of closing the convertible top thus foregoing the most enjoyable feature of such convertibles. Additionally, the cover of the present invention quickly converts a standard front and rear seat convertible into a sports type car having only the front seat exposed with the remainder of the automobile appearing to be extremely modern and streamlined in shape. These features, in addition to the significant comfort and safety provided by the use of this device, coupled with the manner in which the cover can expeditiously be applied and removed requiring basically only two quick lock clamps, result in a highly desirous and novel structure.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a convertible automobile having a front seat and a rear seat, a completely removable rigid self-sustaining tonneau cover for enclosing said rear seat, said tonneau cover having the side edges thereof freely engaged on the top edges of the opposite sides of the automobile, a front edge positionable juxtaposed to and out of contact with the rear of the front seat so as to allow free adjustment thereof, and a rear edge engageable with the automobile behind the rear seat, and means for releasably clamping each side edge of the tonneau cover downwardly against the automobile side edges.

2. The combination of claim 1 wherein said means consists of a bracket mounted on and depending from the undersurface of the cover inward of each side edge adjacent the forward edge thereof and a separate cooperating clamp mounted on the inside surface of each side of the automobile.

3. The combination of claim 2 including two rearwardly inclined raised portions on the upper surface of the tonneau cover, the forward ends of said raised portions being positioned over and directly behind both the driver seat and the passenger seat.

4. The combination of claim 3 including cushion means secured to the forward ends of the raised portions, said cushion means forming a substantial continuation of the upright portion of the front seat so as to act as a headrest for the riders.

5. The combination of claim 4 including a boot on the convertible, said boot including a plurality of snap fasteners, said cover rear edge including a plurality of snap fasteners adapted to engage the snap fasteners on the boot.

6. The combination of claim 4 wherein said cover rear edge includes a downwardly offset outwardly extending portion engageable beneath a portion of the automobile body rearwardly of the upper edge of the rear seat.

7. The combination of claim 4 wherein the cushion means is provided with a downwardly extending centrally located portion adapted to cover the space normally provided between adjacent bucket seats.

8. For use in combination with a convertible automobile having a front seat and a rear seat, a rigid removable tonneau cover, said cover being of a size so as to completely cover the rear seat, said cover having a pair of rearwardly extending raised portions on the upper surface thereof, said raised portions being positioned for alignment with the driver and front passenger seats, the forward ends of the raised portions being in alignment with the forward edge of the cover and of a height so as to act as headrests, said raised portions gradually decreasing in height rearwardly from the forward ends, and means depending from the undersurface of the cover for securing said tonneau cover to the automobile.

References Cited in the file of this patent

UNITED STATES PATENTS

| | | |
|---|---|---|
| 278,964 | Griffith | Oct. 20, 1927 |
| 2,122,449 | Berlin | July 5, 1938 |
| 2,686,076 | Helser | Aug. 10, 1954 |
| 2,743,029 | Mautner | Apr. 24, 1956 |
| 2,959,447 | Stebbins | Nov. 8, 1960 |
| 2,998,272 | Newcomer | Aug. 29, 1961 |

FOREIGN PATENTS

| | | |
|---|---|---|
| 224,598 | Great Britain | Nov. 14, 1924 |
| 258,078 | Great Britain | Sept. 16, 1926 |